United States Patent [19]

Blue et al.

[11] Patent Number: 5,196,835
[45] Date of Patent: Mar. 23, 1993

[54] LASER TOUCH PANEL REFLECTIVE SURFACE ABERRATION CANCELLING

[75] Inventors: Larry A. Blue, Durham; Bruce T. Freedman, Cary, both of N.C.; Jose F. Gonzalez-Heres, Miami Beach, Fla.; Alexander G. MacInnis, Chapel Hill, N.C.

[73] Assignee: International Business Machines Corporation, Armonk, N.Y.

[21] Appl. No.: 697,493

[22] Filed: May 2, 1991

Related U.S. Application Data

[63] Continuation of Ser. No. 554,977, Jul. 12, 1990, abandoned, which is a continuation of Ser. No. 251,604, Sep. 30, 1988, abandoned.

[51] Int. Cl.⁵ .............................................. G09G 3/02
[52] U.S. Cl. ................................. 340/712; 341/20; 341/31
[58] Field of Search ............... 340/706, 712; 341/20, 341/31; 178/18, 19; 250/221; 364/520, 521

[56] References Cited

U.S. PATENT DOCUMENTS

| | | | |
|---|---|---|---|
| 4,294,543 | 10/1981 | Apple et al. | 178/18 |
| 4,507,557 | 3/1985 | Tsikos | 340/712 |
| 4,553,842 | 11/1985 | Griffin | 340/712 |
| 4,558,313 | 12/1985 | Grawin et al. | 178/18 |
| 4,568,182 | 2/1986 | Modjallal | 178/18 |
| 4,703,316 | 2/1987 | Sherbeck | 178/18 |
| 4,710,759 | 12/1987 | Fitzgibbon | 341/31 |
| 4,710,760 | 12/1987 | Kasday | 340/712 |
| 4,782,328 | 11/1988 | Delinger | 340/712 |
| 4,905,174 | 2/1990 | Ouchi | 340/712 |
| 4,943,806 | 7/1990 | Masters et al. | 340/712 |

FOREIGN PATENT DOCUMENTS 0181612  5/1986  European Pat. Off.
0221712  5/1987  European Pat. Off.
8602755  5/1986  World Int. Prop. O.

Primary Examiner—Ulysses Weldon
Assistant Examiner—M. Fatahiyar
Attorney, Agent, or Firm—Joscelyn G. Cockburn

[57] ABSTRACT

A method and apparatus that distinguish a valid touch from an optical aberration caused by unwanted objects and/or scratches in the light plane of an optical touch panel device is disclosed. During a training mode the device learns the relative position of "aberration dropouts" caused by the unwanted objects. During normal operating mode the relative positions of "touch and aberration dropouts" are generated and compared with the relative position of aberration dropouts to distinguish between aberration dropout signals and touch dropout signals. The touch dropout signals are subjected to further processing to determine the precise location of a touch while the aberration dropout signals are discarded.

15 Claims, 9 Drawing Sheets

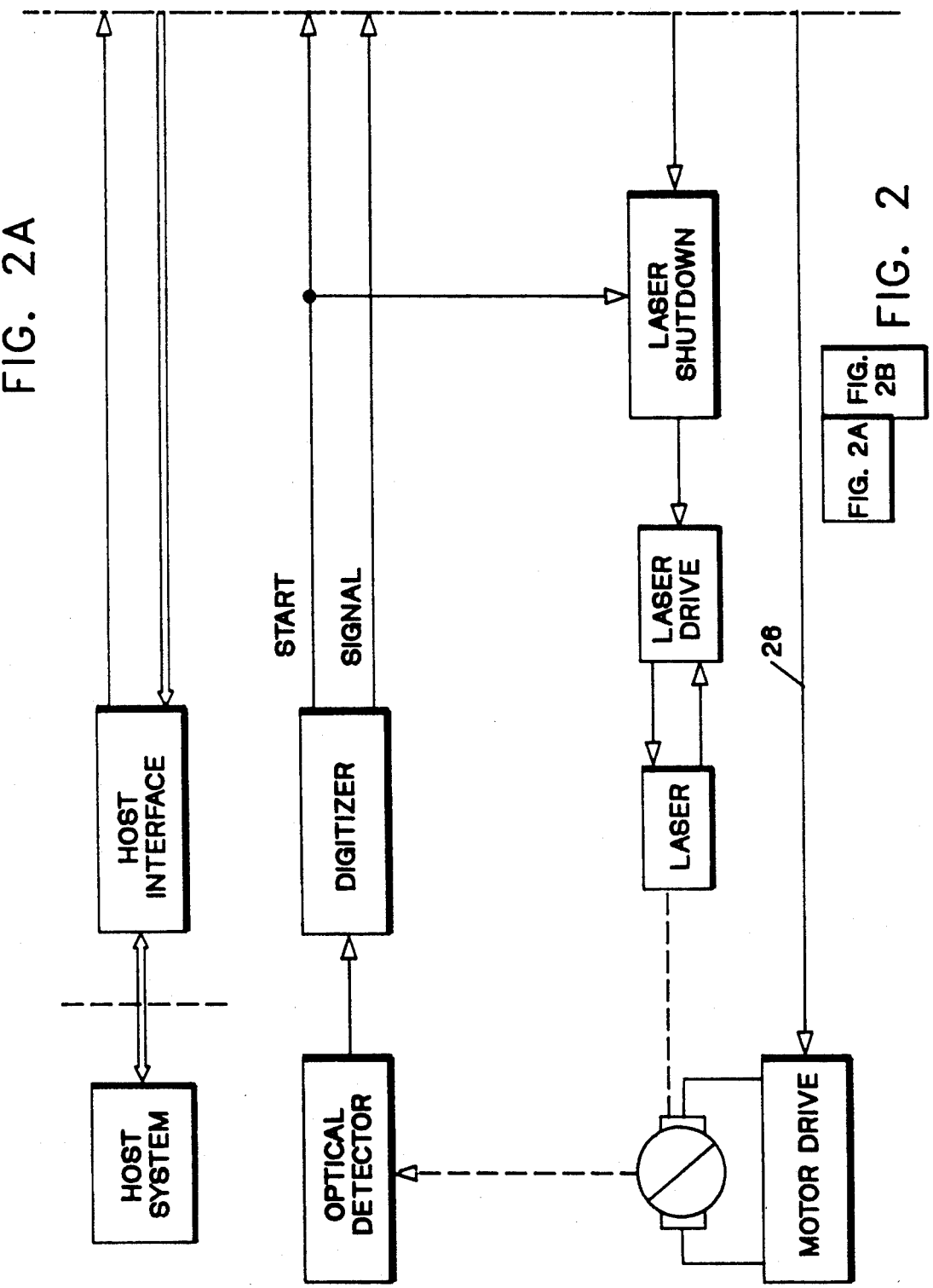

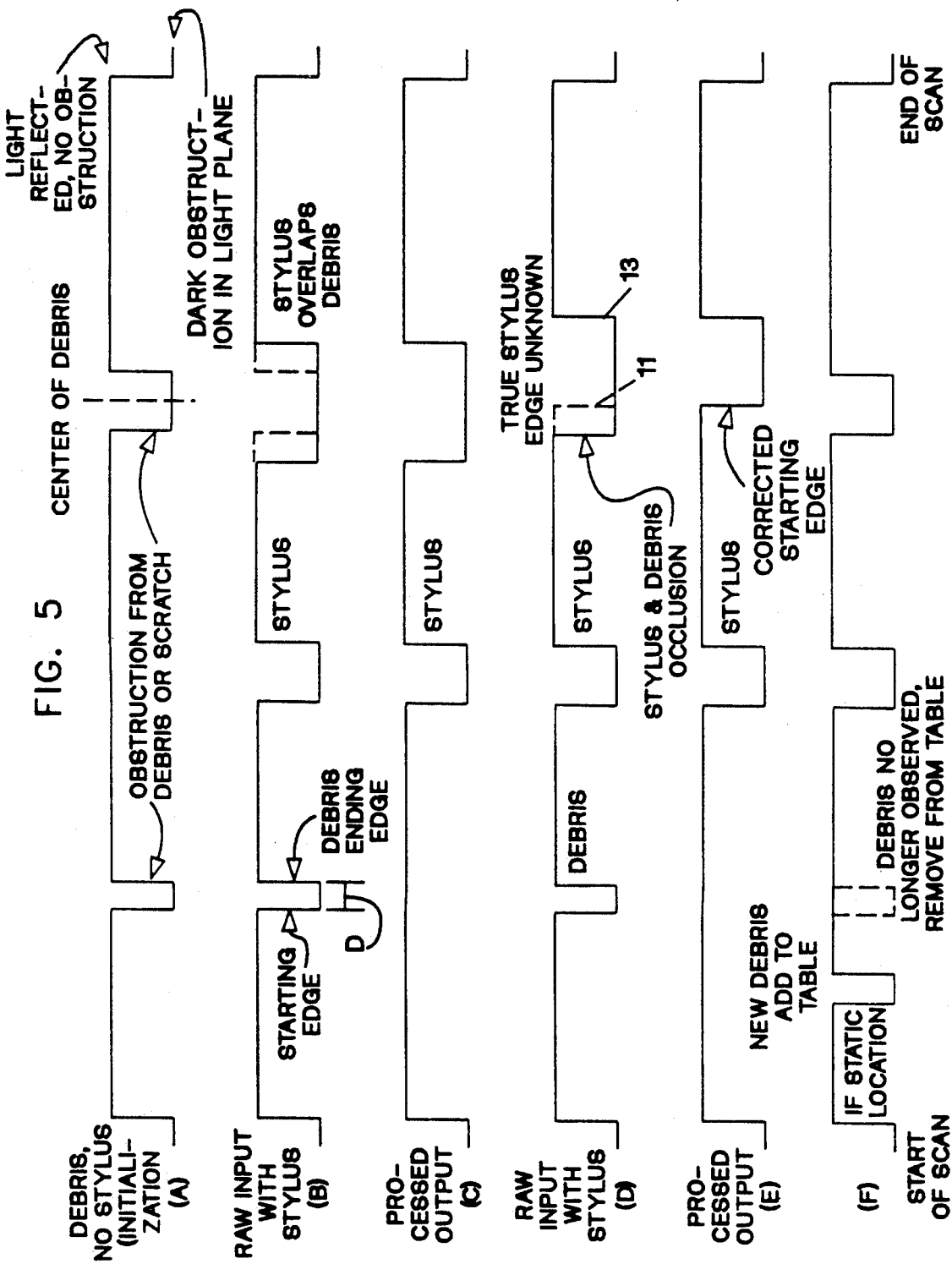

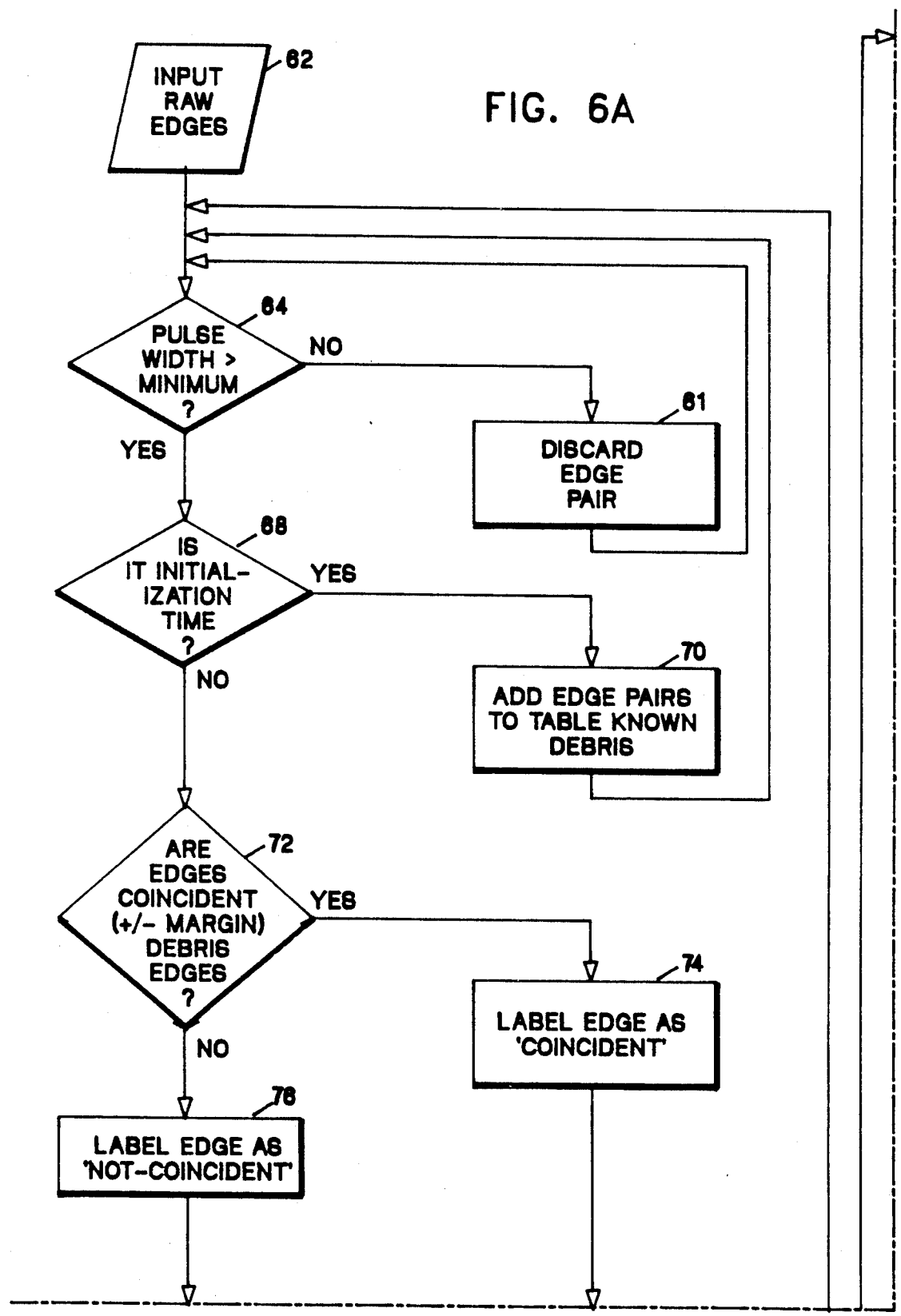

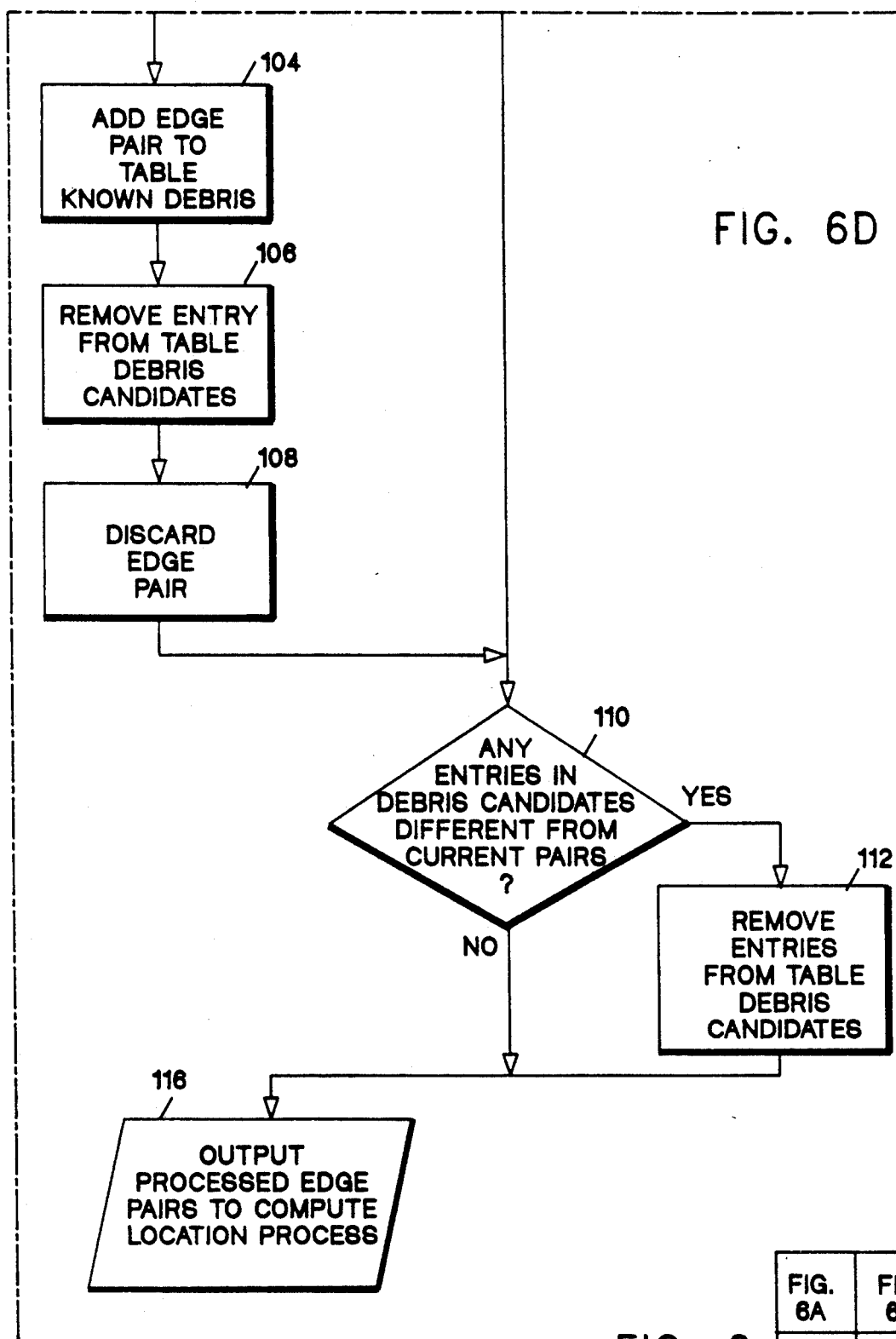

LASER TOUCH PANEL REFLECTIVE SURFACE ABERRATION CANCELLING

This application is a continuation of U.S. application Ser. No. 07/554,977, filed Jul. 12, 1990, now abandoned which is a continuation of prior application Ser. No. 07/251,604, filed Sep. 30, 1988 now abandoned.

BACKGROUND OF THE INVENTION

1. Field of the Invention

The present invention relates to optical devices which utilize light beams to identify the coordinates of an object intersected by the light beams.

2. Prior Art

The use of optical touch panel devices as I/O terminals for data processing systems is well known in the prior art. A typical optical touch panel device includes a CRT with a transparent layer disposed over its screen An optical assembly which includes light generating sources, photodetector, reflectors, etc. is placed relative to the translucent layer. The optical assembly generates a plurality of light beams which criss-cross the surface of the translucent layer. If there is no object blocking the light rays, the light travels from the light generating source uninterrupted to the photodetector producing a continuous photodetector current. If an object is placed within the light plane formed by the rays, the object blocks the light beam from contacting the photoconductor. This causes a discontinuous photodetector current. The discontinuity in photodetector current is called "light dropout" which indicates the presence of an object.

A triangulation algorithm or similar technique uses the light dropout phenomenon to calculate the precise location of the object. In case of a touch to the CRT surface by a pointer to indicate a location on said CRT surface, the triangulation technique can be used to identify the precise location where the contact occurs. A more detailed description of these prior art devices is set forth in the following U.S. Pat. Nos.: 3,553,680 (Cooreman), 3,613,066 (Cooreman et al), 3,898,445 (Macleod), 4,294,543 (Apple et al), 4,420,261 (Barlow et al), 4,558,313 (Garwin et al), 4,710,759 (Fitzgibbon et al) and 4,710,758 (Mussler et al).

A problem which is common to the above-described optical devices, and not addressed by the prior art, is system degradation caused by optical aberrations. Optical aberrations may include a discontinuity in one or more of the reflective surfaces, a scratch on the protective plastic shield that encloses the optical emitter/detector and/or reflective surfaces, debris, etc. As with the valid touch to the CRT surface, the optical aberration prevents the light beam from reaching the photodetector. This unwelcome intrusion causes light dropout called "aberration dropout" in the photodetector current. These aberration dropouts appear as valid touches to the system. In addition, most systems are only capable of detecting one touch at a time. Since an "aberration dropout" is processed as a valid touch, a valid touch may go undetected causing a catastrophic system failure.

A straightforward solution would be to make sure that the reflective surfaces are free of aberrations. This can be achieved through rigid control of manufacturing and maintenance processes. This solution may not be practical since it may unnecessarily increase the cost of the system. Also, such terminals may be used in uncontrolled environments (such as public information access applications) in which it may not be possible to prevent damage to or degradation of the reflective surfaces.

SUMMARY OF THE INVENTION

It is a general object of the present invention to provide a more efficient optical touch panel terminal than was heretofore possible.

It is a specific object to provide an optical touch panel device which compensates for light dropout caused by optical aberration in the system.

These and other objects of the invention are achieved by causing the touch panel device to cycle through a training mode in which it generates an electronic image of the relative positions of optical aberrations on the touch panel. The optical aberrations may result from debris, other foreign particles, scratches, etc. on the reflecting surface of the terminal. During normal operating mode, electronic images of valid touches and optical aberrations are generated. A comparison is made between relative positions of the electronic images generated during the normal operating mode and the electronic images for the optical aberrations. If the displacement between the electronic image falls within a range of values, additional process steps are undertaken to distinguish the electronic images caused by a valid touch, and those caused by optical aberrations. If the displacement falls outside of the range of values, the electronic image for the valid touch is used to calculate the precise location of the touch. If the displacements coincide, the electronic images are characterized as optical aberrations.

In one embodiment of the present invention the displacement between the edges of pulses (pulse width) generated during normal operating mode is compared with a referenced value and discarded as optical aberration if said pulse width is less than the referenced value.

In particular, the system learns the location of optical aberrations. Preferably, this is done during an initialization run there is no pointer in the light plane. Therefore, all obstruction is more likely to be caused by scratches and/or debris.

Each optical aberration causes a pulse in the electronic image. The two edges (starting or leading and ending or trailing) of each pulse are measured and their locations are entered (stored) into a table called "Known Debris." The measurements are repeated several times and the results are averaged over the iterations to account for possible noise or jitter.

As with optical aberrations, valid touches (by styli and/or finger) also cause pulses in the electronic image. Thus, during normal operation the resulting pulses are caused by optical aberration (optical aberration pulses) and valid touch (touch pulses). The leading and trailing edges of all pulses are measured. Each edge is compared with the corresponding edges which are stored in the "Known Debris" table. If a measured starting edge is found to coincide, plus or minus a small margin, with a starting edge in the table, then this edge is assumed to be caused by debris. Likewise, if a measured ending edge is found to coincide with an ending edge entry in the table, then that edge is assumed to be caused by debris.

If both edges coincide, as measured above, with edges of known debris, then the entire obstruction is assumed to be caused by debris or a scratch. In this case both edges are discarded and receive no further processing.

If a measured starting edge is not coincident with a known starting edge, and the measured ending edge is not coincident with a known ending edge, then it is assumed that the pulse is caused by a pointer. While in this case it is possible that the pulse caused by a pointer overlaps completely a pulse caused by debris, this does not affect the resulting accuracy. The edges of all such valid pulses are passed to the process which computes the pointer position. The pointer could be a finger stylus or other such indicator. For simplicity of explanation, the term "stylus" is used for pointer.

If one measured edge of a pulse coincides, as measured above, with a Known Debris edge, and the other edge of the same pulse does not, then it is assumed that pulses caused by a valid stylus and Known Debris partially overlap, and that the coincident edge is the result of debris. This partial overlap is called an occlusion. The location of this coincident edge is therefore likely to be different from the true stylus edge, and its correct location is estimated. Since the actual relationship between stylus edge and debris edge is unknown and random, the correct edge is estimated as the center of the Known Debris item which caused the coincident edge. This corrected edge and the other, non-coincident, edge are passed to the process to compute the precise touch location.

One embodiment of the invention provides for updating or adjusting the "Known Debris" Table. The table is adjusted by adding and/or deleting entries.

The "Known Debris" table is updated at times when it is determined that debris has been added to or removed from the light plane. There are many possible methods of determining when to update the table, and various ways of performing this update. The adjustment compensates for new debris which may have been added to the system or old debris which may have been removed from the system.

Removal of Entries from the Table:

One of the preferred methods to remove entries from the table is as follows:

At each pass of examining the measured edges and comparing them with Known Debris edges, if a pair of edges representing an item of debris is not found and is not overlapped by a pointer pulse, then it is assumed that the debris item has been removed from the light plane. In this case the entry is removed from the table of Known Debris.

Adding Entries to the Table:

Each pair of edges passed from the present invention to the process which computes the touch location on the touch panel is assumed to be associated with a valid stylus touch, but could in fact be due to a new scratch or piece of debris. At each pass of examining measured edges all such edge pairs are put into a temporary table, called "Debris Candidates," along with an entry indicating when this edge pair was first entered in the table. If an edge pair is found to be in the same location for many successive passes (longer than is reasonable for a real stylus touch), then it is determined that the edge pair is due to a new piece of debris or scratch. The edge pair is then entered in the "Known Debris" table and removed from the "Debris Candidates." Any edge pair in the Debris Candidates table which does not recur on the next pass is removed from the candidate table.

Debris which moves is seen as the removal of debris at one location and a new piece at another location. It is removed from the "Known Debris" table when it is not observed in its original location, and it is added when it is observed to be stationary at the new location.

It is worthwhile noting that pulses resulting from a stylus which is inadvertently present at initialization are removed as soon as the stylus is withdrawn from the light plane.

Another embodiment of the invention sets a programmable range of values for pulse widths which represent valid stylus touches. Any edge pairs falling outside of the range of values are therefore assumed to be scratches or debris and are discarded. In particular, any edge pair with pulses narrower than a set pair of values are characterized as debris and/or scratches. The edge pairs or pulses are discarded before any processing takes place. This procedure will effectively remove electrical pulses resulting from scratches and/or small debris.

The foregoing and other objects and features of this invention will be more fully described in the accompanying drawings.

BRIEF DESCRIPTION OF THE DRAWINGS

FIGS. 2, 2A and 2B show data flow diagram for a touch panel system which embodies the teaching of the present invention.

FIGS. 5A-5F show graphs of electronic pulses caused by obstructions (debris, scratches, stylus, etc.) in the light plane of the touch panel device. The graph is helpful in understanding the process used to distinguish between valid touches and debris. r FIGS. 6A-6D show flow charts of a filtering program used in the microcomputer to perform the filter function according to the teachings of the present invention.

DETAILED DESCRIPTION OF THE PREFERRED EMBODIMENT

The present invention may be used with different types of optical touch panel devices. It works well with a scanning type optical touch panel device and, as such, will be described in that environment. However, this should not be construed as a limitation on the scope of the invention since it is well within the capabilities of one skilled in the art to use the described invention in other types of optical touch panel devices as is or with minor modifications without deviating from the teachings of the present invention.

Figure 1:
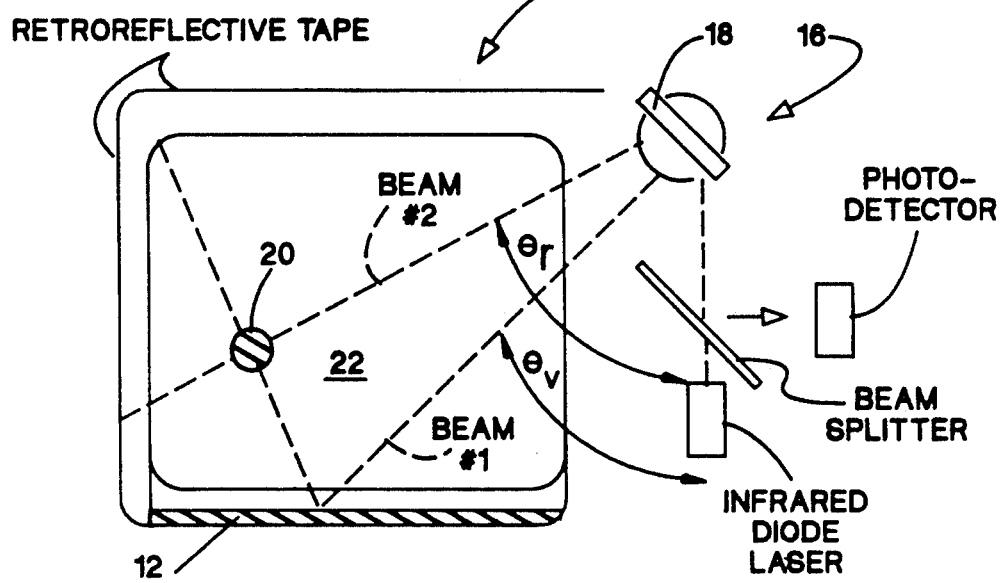
FIG. 1 shows a mechanical schematic of an optical touch panel terminal embodying the teachings of the present invention.

FIG. 1 shows a mechanical schematic of a scanning type optical touch panel device. The device includes a frame 10 which is mounted a few inches from the face of a cathode ray tube (not shown). The frame creates a plane within which a laser beam (to be described subsequently) is reflected to form a light plane. To this end, a mirror like material 12 is painted to one side of the frame and retroreflective tape is placed on adjacent surfaces. Scanner module 16 is positioned relative to the frame. The scanner module includes a stepper motor (not shown) operating in a synchronous mode and a single-sided mirror 18 mounted to the motor shaft of the stepper motor. An optical assembly which includes an infrared diode laser, a beam splitter and a photodetector is mounted relative to frame 10. The infrared diode laser generates a monochromatic light beam which the scanner scans across the face of the frame. The beam splitter allows the beam from the scanner to be incident on the rotating mirror and returned laser light to be reflected into the photodetector. A lens (not shown) is positioned in front of the photodetector and focuses returned rays into the photodetector.

If there is no stylus or finger in the scanning plane of FIG. 1, the beam is allowed to return to the optical block which houses the laser, a photoconductor, a beam splitter, lenses, etc. However, when a stylus or finger 20 intersects the scanning plane 22, the beam is blocked during each scan. It is blocked once when the scanning mirror is an orientation ($\theta_y$) where the beam bounces off the mirror-like material and its stylus, and again when the scanning mirror is at a second orientation ($\theta_r$) where the beam hits the stylus directly off the scanning mirror. Blockage of the laser beam prevents the beam from reaching the photodetector and causes a pulse to be generated by the detection circuitry in the system. The time difference between each blockage pulse and the start of the scan is calculated, and represents an angular measurement of the scanning mirror's orientation with respect to the start of the scan. The location of the stylus is computed using triangulation techniques. Details of this technique are set forth in U.S. Pat. Nos. 4,558,313 and 4,762,990 which are assigned to the assignee of the present invention and are incorporated herein by reference. As used in this document, stylus includes a finger or any other object that can be used in the scanning plane.

Figure 2B:
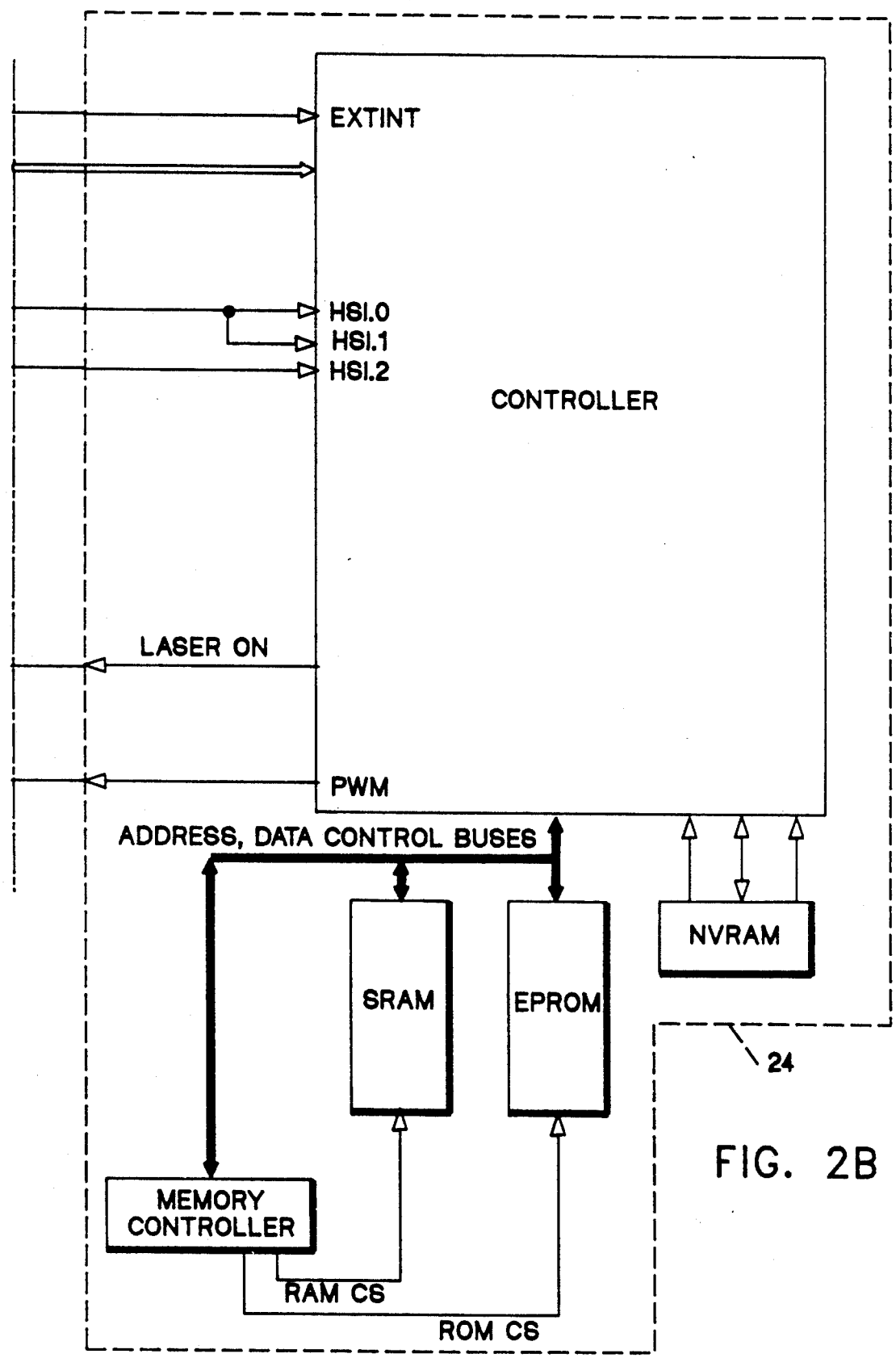

FIGS. 2A and B show a functional block diagram of the optical touch panel terminal. The terminal includes a controller 24 connected through a plurality of interfaces to a host system, the optical detector and the motor which drives the scanning mirror. In the preferred embodiment of this invention the controller includes an Intel 8096 microcontroller. Details of the microcontroller are set forth in the operational manual which is easily available and is incorporated herein by reference. Thus, only the features of the controller which are necessary for understanding the present invention will be described, it being understood that additional information on the microcontroller is available in the subject manual. The microcontroller is connected by an internal bus structure to a SRAM, EPROM and memory controller. The memory controller generates and outputs a RAM CS signal for activating the SRAM and ROM CS for activating the EPROM. A separate bus structure interconnects the microcontroller to an NVRAM. The microcontroller is a conventional off-the-shelf device which is distributed with an operational manual which sets forth the instruction set of the microcontroller and can be used by a skilled programmer to perform the following functions: detect pulses, calculate XY location, axis transformation calibration, laser shutdown, motor startup, supervisory functions, diagnostics, and NVRAM RD/WR operations. The 8096 microcontroller has a 16-bit arithmetic processor and a high speed (HS) input front end. The high speed input front end is coupled through conductors labeled "Start" and signals to a digitizer which receives analog signals from the optical detector, converts them into digital signals and transmits the digital signal to the microcontroller. Pulses containing the touch location information are captured in a high speed input section that runs simultaneously with the 8096 code processor. The times at which the pulses edge occur are recorded with two microsecond resolution and placed in an eight deep FIFO (not shown) for later use by the 8096 code processor.

The 8096 microcontroller has a double buffered serial communication port labeled "EXTINT" and is coupled through the host interface to a host system which may be a mainframe, a PC or the like. Various host interfaces are possible. Synchronous and asynchronous serial data links can be supported. The system software includes a calibration routine that corrects for parallax error. The routine generates calibration constants that are stored in the EPROM and recalled when the system is initialized. The 8096 microcontroller has a pulse width modulator (PWM) which generates a signal and outputs it on conductor 26 to control the motor drive. Likewise, the 8096 microcontroller generates control signals for controlling the laser.

In addition to the above-described functions, the 8096 microcontroller is programmed to function as a debris and scratch filter eliminator. The debris and scratch filter eliminator removes or cancels pulses which are caused by scratches and/or debris on reflective surfaces of the touch panel device. As a result, the system can distinguish between valid touches and aberrations resulting from scratces and/or debris on the reflecting surfaces.

Figure 3:
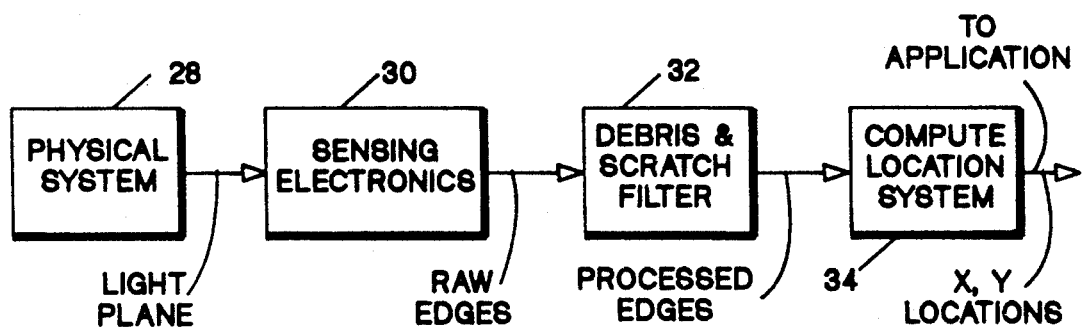
FIG. 3 shows a functional block diagram of the optical touch panel terminal.

FIG. 3 shows a simplified data flow diagram embodying the teachings of the present invention. The data flow includes physical system 28 which generates a light plane including laser beams which are blocked due to an interruption (caused by a finger and/or stylus, debris, etc.). The light plane is fed into sensing electronics 30 which generate values representative of the leading and trailing edges of pulses caused by obstructions in the light plane. These values called "raw edges" are fed into the debris and scratch filter 32 (details to be given subsequently). Suffice it to say at this point that the debris and scratch filter 32 removes pulses which result from debris and/or scratches on the reflective surfaces of the scanning device. The remaining pulse called "processed edges" are fed into the compute location system which outputs XY coordinates representing the precise location of a touch on the touch panel. These locations can be forwarded to application programs in the 8096 microcontroller or any other computer for further processing.

The debris and scratch filter 32 is comprised of the 8096 microcontroller and a novel computer program (details of which will be given subsequently).

Figure 4:
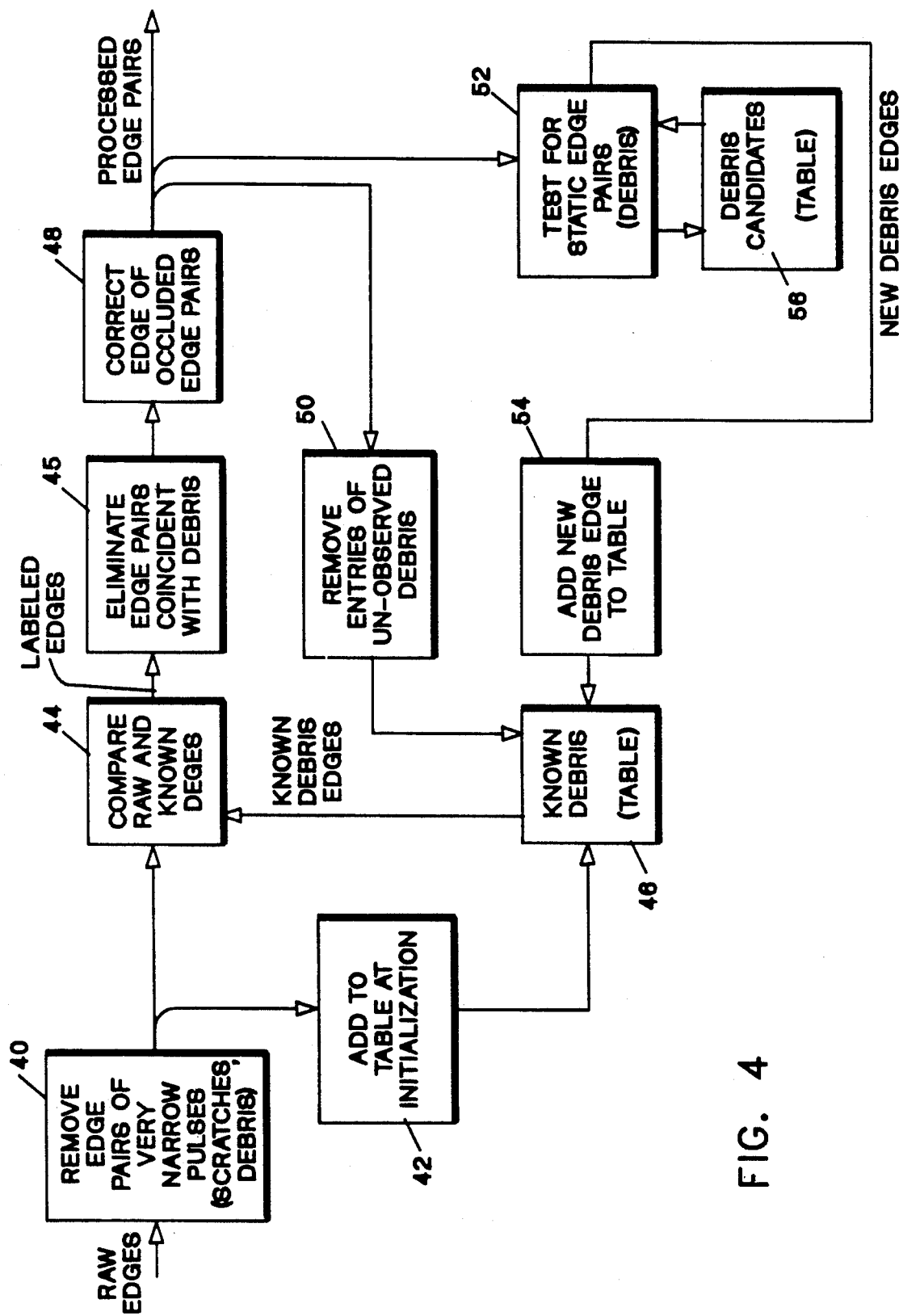
FIG. 4 shows a data flow diagram for the scratch and/or debris filter according to the teachings of the present invention.

Referring now to FIG. 4, a detailed data flow diagram for the debris and scratch filter 32 (FIG. 3) is shown. In the preferred embodiment of the present invention the debris and scratch filter 32 is provided by the 8096 microcontroller and an appropriate software program. Before discussing the data flow, in debris and scratch filter 32 a review of the pulses which are generated and delivered to the debris and scratch filter 32 may aid in a better understanding of the present invention. These pulses and signals which are forwarded to the computer location system 34 (FIG. 3) are set forth in FIGS. 5A-5F.

Turning to FIGS. 5A-5F for the moment, graph A shows an electronic image of pulses caused by debris or scratches on the reflective surface of the terminal. As will be explained subsequently, these pulses can be generated during an initialization period when it can be reasonably assumed that a touch object is not within the light plane of the terminal. The signals in FIGS. 5A-5F have two levels. One of the levels is a dark level which occurs with a dark obstruction in the plane. The second level occurs when light is reflected from the reflecting surfaces and no obstruction is in the plane. The pulses in graph A are the result of debris or scratches in the light plane.

Graph B represents the electronic images of pulses caused by debris and/or scratches and a touch instrument called a stylus in the light plane. Viewing the pulses from left to right, each pulse has a starting or leading edge and an ending or trailing edge. For purposes of discussion, the spacing between the edges is called displacement (D). During each scan, the time which elapses relative to reference times (Start of Scan and End of Scan) and detection of each edge is captured and stored in memory and is subsequently used by the teaching of the present invention to eliminate those pulses that are caused by debris and/or scratches in the system.

Still referring to graph B and viewing the pulse in a left to right direction, the first pulse represents debris in the system. The second pulse (labeled Stylus) represents a valid touch on the touch panel and the last pulse represents a valid touch which overlaps a debris pulse. The debris pulse is shown with broken lines. The present invention eliminates the first pulse due to debris and outputs the pulses shown in graph C. These pulses are forwarded to the compute location system (FIG. 3) which generates XY location and forwards the same to an application program in the microcontroller.

Still referring to FIG. 5, graph D which is labeled "raw input with stylus" shows an electronic image for pulses caused by debris and valid touch on the touch panel. As is stated, the present invention is to eliminate the effects of pulses caused by debris and/or scratches and forwards only pulses which represent valid touches on the touch panel. Viewing the pulses from left to right, the third pulse is of interest because the leading edge of the measured pulse and the leading edge of the debris pulse coincide. While the trailing edge of the measured pulse does not coincide with the trailing edge of the debris, the pulse from the stylus and the pulse from the debris overlap. This is referred to as an occlusion. The true leading edge of the stylus pulse is unknown as it is in effect covered by the debris. Thus, the present invention uses an estimation technique to determine the true stylus edge. To correct this problem the algorithm of the present invention places the starting edge 11 of the pulse on the center line of the debris pulse and the trailing edge of the pulse coincides with the trailing edge 13 of the stylus pulse.

Graph E shows the two pulses which are outputted from the present invention when graph D is the pulses generated from sensing electronics 30 (FIG. 3).

Finally, graph F shows an electronic image of pulses generated during a scan. The time values which are calculated for the leading and trailing edges of these pulses are used to update the stored table for scratches and/or debris. Viewing the graph in a left to right direction, the first pulse represents a new debris pulse which is detected and is added to the debris table. As will be explained subsequently, the debris table is updated with the values for this pulse after the pulse is observed to be in the same position for a predetermined time. The second pulse shown in broken lines represents a situation where the debris in graph A is no longer present in the system. In this situation the values for this pulse would be deleted from the debris table. The third pulse is a stylus. Finally, the fourth pulse coincides with the debris pulse of graph A and thus no adjustment is made to the table for this pulse.

Referring again to FIG. 4, there is shown a data flow diagram for the debris and scratch filter 32 (FIG. 3). As was stated previously, values for the leading and trailing edges of pulses (raw edges) which are outputted from the sensing electronics 30 (FIG. 3) are fed into the debris and scratch filter which eliminates those pulses which are caused by scratches and/or debris in the system. The remaining pulses which are caused by valid touches to the touch panel are forwarded to other functions in the system which identify the precise XY location of touches on the panel. Function block 40 is the first block of the debris and scratch filter 32. Function block 40 removes pulses whose width is less than a predetermined value. Pulses which are caused by valid touch have a width greater than a predetermined value. Any pulses whose width is less than this predetermined value is assumed to be debris or scratches and are eliminated. Pulses which survive this elimination technique are fed into function blocks 42 and 44, respectively.

Function block 42 records the edge values for the remaining pulses in "Known Debris" Table 46 during initialization phase. Function block 44 receives those pulses surviving the scrutiny of function block 40 and compares them with values for pulses extracted from table 46. The edges of the pulses are labeled and fed into function block 45 where edge pairs of pulses coinciding with edge pairs of Known Debris or scratch pulses are eliminated from the system. If there are any stylus and debris occlusion pulses function block 48 estimates the edge position of the touch pulse and forwards the remaining edge pairs (processed edge pairs) to the compute location system which uses the pulses to identify specific touch locations on the touch screen.

Still referring to FIG. 4, function block 50 removes any unobserved debris from Known Debris table 46. A debris could be unobserved because it has been removed from the reflective surfaces. Such removal may be due to cleaning which removes any debris which may have been present on the reflective surface when the initialization scan was undertaken. Such debris would not create a pulse in a subsequent scan. Thus, its edge values are erased from the Known Debris table. Function block 52 performs tests on edge pairs outputted from function block 48 to identify static edge pairs. Such static edge pairs are characterized as debris and are added to the Known Debris table 46 by function block 54. Function block 52 records the values for static edge pairs in "Debris Candidates" table 56. Whenever a value in debris candidate table 56 is present for a predetermined period of time, the obstruction is characterized as a debris and/or scratch and the edge values are added as new debris edges to the Known Debris table. It should be noted that as used in this application debris edge relates to the time values which are recorded for absorbing the leading and trailing edges of a pulse.

Referring now to FIGS. 6 and 6A-6D, a flow chart setting forth the program which controls a microcontroller such as the Intel 8096 to filter with scratches and/or debris pulses is shown. The program is labeled with numerals 61-116.

Figure 6B:
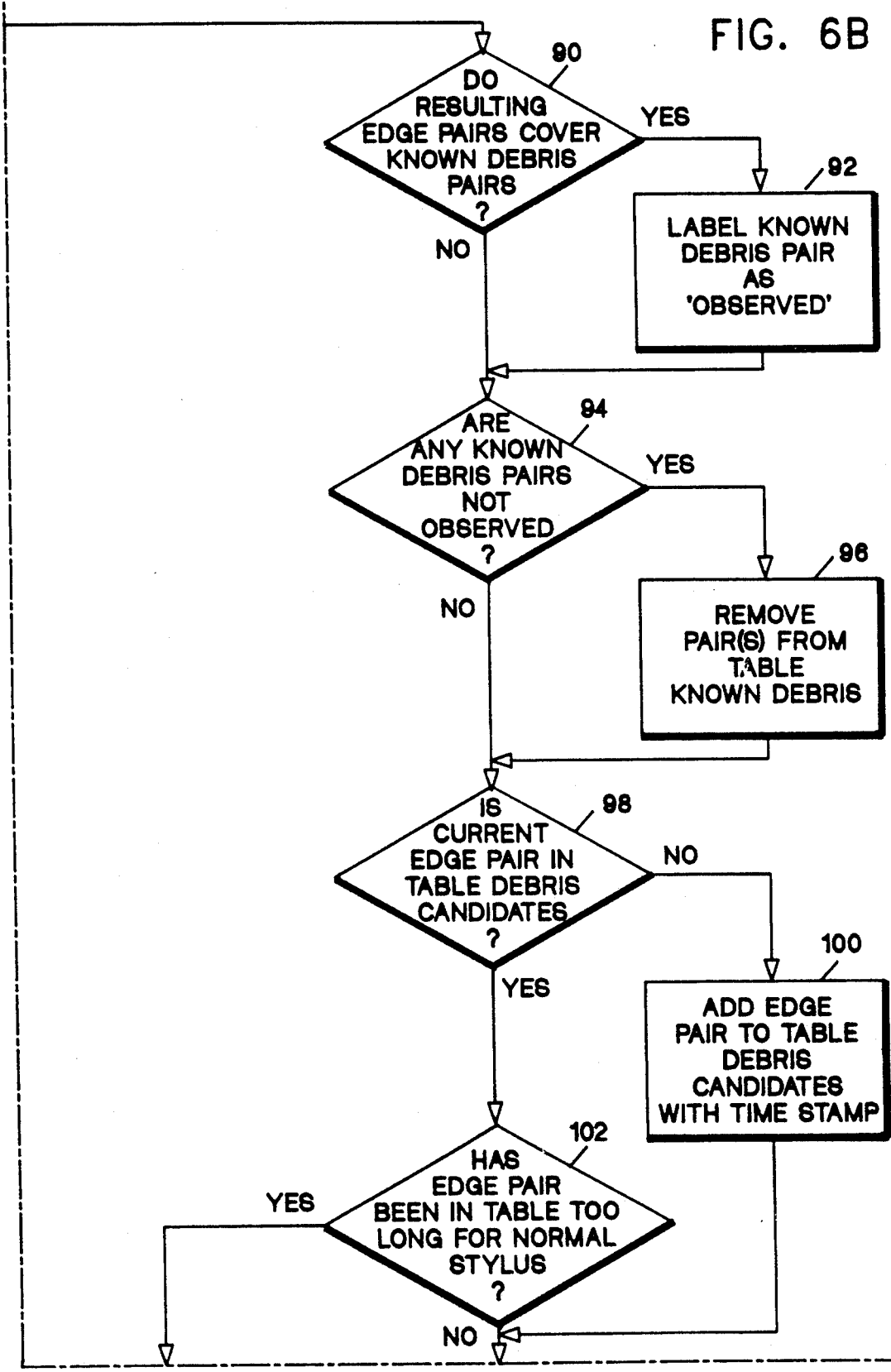
Figure 6C:
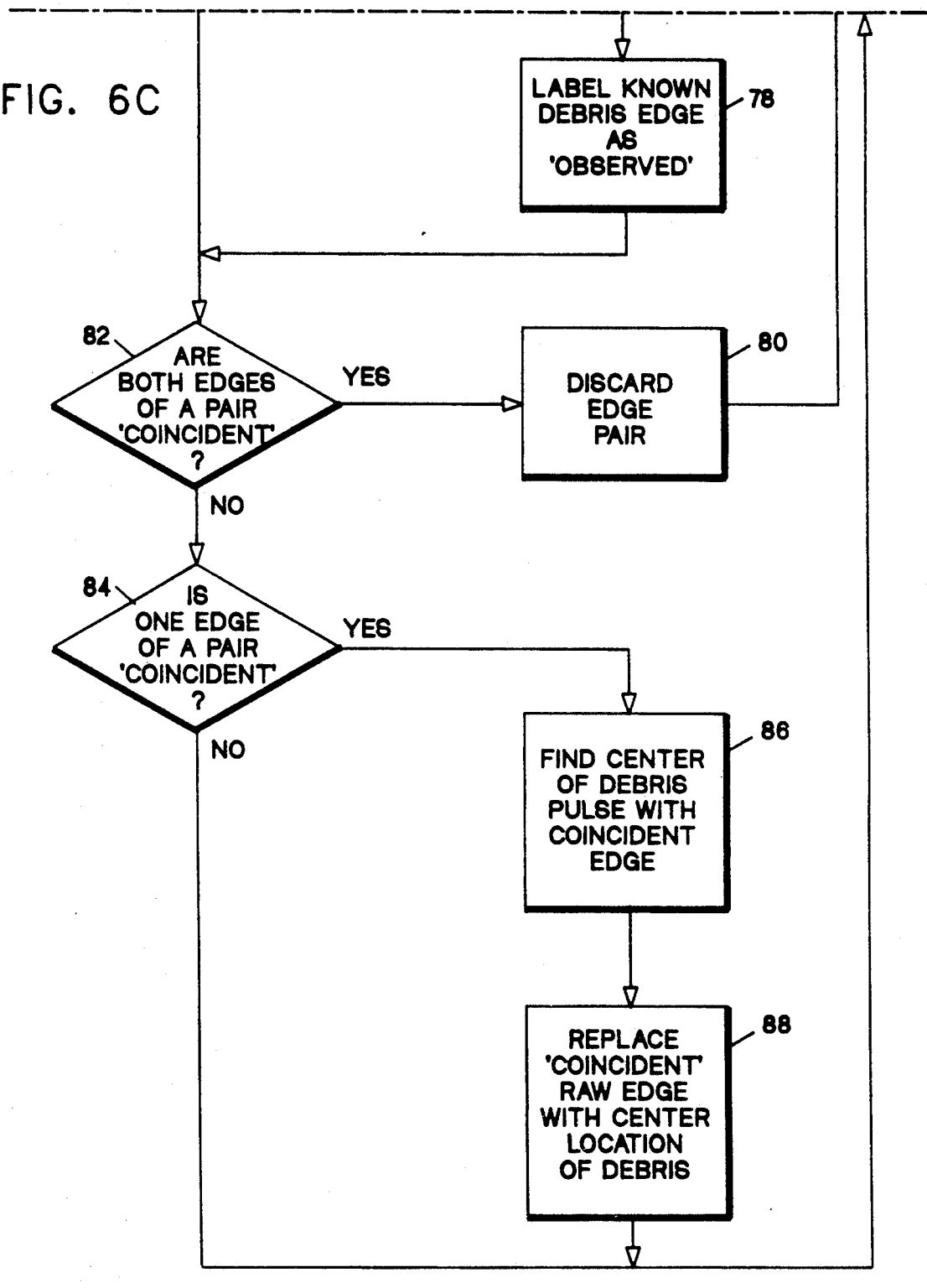

With particular reference to FIG. 6A, function block 62 provides the input raw edges data which represents pulses generated from obstruction in the light plane of the scanner. In block 64 the program tests to see if the width of the pulses is greater than or equal to a minimum value. Pulses whose width falls below the minimum value are discarded in block 61. It should be noted that the program is looking on numbers representative of a pulse. One set of the numbers represents a leading edge of a pulse, and the other set of numbers represents the trailing edge (see FIG. 5 for a representation of the respective pulse). Following this function performed by block 61, the program loops and enters into block 64 where the test for minimum pulse width is again undertaken. Pulses whose width falls outside of the minimum pulse width are forwarded to decisional block 68. There the program is checked to see if it is initialization time. At initialization time it is assumed that any pulse generated by objects in the light plane is due to a scratch or debris. If the result from block 68 is yes, the program then enters into block 70 where it adds the value for the edge pairs to the Known Debris table. The program then loops and re-enters into block 64. If the result from block 68 is no, the program enters into decisional block 72. In block 72 the program checks to see if the edges of the pulses coincide with Known Debris edges. If the decision is yes, the program enters block 74 where it labels the edge as coincident and enters block 78 (FIG. 6C). In block 78 the program labels Known Debris edge as "observed" and enters block 82. If the test in block 72 (FIG. 6A) was a no, the program then enters block 76. In block 76 the program labeled the edge is "Not Coincident" and enters block 82 (FIG. 6C).

Referring now to FIG. 6C, in block 82 the program checks to see if both edges of the pulse coincide with known edges of a debris pulse. If they do, the program enters block 80 where the pulse is discarded as debris and the program loops back to block 64 (FIG. 6A).

Still referring to FIG. 6C, if the test from decisional block 82 is no, the program enters block 84. In block 84 the program checks to see if one edge of a pulse obtained during a normal run and one edge of a pulse representing a debris or scratch coincide. If one edge coincides, the program enters block 86. In block 86 the program finds the center of the debris pulse with coincident edge. The program then enters block 88. In function block 88 the program replaces the coincident raw edge with the center location of the debris pulse and enters block 90 (FIG. 6B). Referring back to block 84, if the test is no, the program then enters block 90 (FIG. 6B).

Referring now to FIG. 6B, in block 90 the program checks to see if a resulting edge pair covers a Known Debris pair. If it does, the program descends into block 92. In block 92 the program labels the Known Debris pair as "Observed" and enters block 94. If the result from block 90 is no, the program enters block 94. In block 94 the program checks to see if any Known Debris pairs are not observed. If the answer is yes, the program enters block 96. In block 96 the program removes the known debris pairs from the debris table. If the result from block 94 is no, the program descends into block 98. In block 98 the program checks to see if the current edge pair is in the temporary debris candidates table. If the answer is no, the program adds the edge pair to the debris candidates table with a time stamp and descends into block 110 (FIG. 6D). If the decision from block 98 (FIG. 6B) is yes, the program descends into decisional block 102. In block 102 the program checks to see if the edge pair has been in the table for a period of time set by the program. If the answer is no, the program descends into block 110 (FIG. 6D). Otherwise, the program descends into block 104 (FIG. 6D).

Referring now to FIG. 6D, in block 104 the program adds the edge pair value to the table of Known Debris and descends into block 106. In block 106 the program removes the edge pair values from the debris candidates table and descends into block 108. In block 108 the program discards the edge pair values and descends into block 110. In block 110 the program checks to see if there are any entries in the debris candidates table different from current pairs. If so, the program descends into block 112 where it removes the entries from the debris candidate table and descends into block 116. In block 116 the program outputs the remaining edge pair values to the compute logic system block of FIG. 3 where the precise XY location of a touch on the touch panel is determined.

Operation

In operation, objects in the light plane interrupt the light and are referred to as obstructions. These can be valid styli, debris or scratches in the optical surfaces. Obstructions cause pulses where the return light is interrupted, and these pulses are identified by their starting and ending edges. The present invention eliminates the effect of debris and scratches on the optical surfaces by the following process:

Step A: Narrow Pulse Elimination:

There is a minimum width for valid pointers touches which is programmed into the System. Any edge pairs representing narrow pulses are therefore assumed to be scratches or debris. These edge pairs or pulses are discarded before any further processing takes place. The effects of most scratches and small debris are eliminated here.

Step B: Learning the Obstruction Locations:

This step is performed when the system is initialized, when it is assumed that there is no valid stylus in the light plane. Therefore, all of the obstructions measured are caused by scratches and/or debris. The two edges (start and end) of each obstruction are measured and their locations are recorded into a table which is called Known Debris. These measurements are repeated several times and the results averaged over the durations to call for possible noise or jitter. Edges resulting from a stylus which is inadvertently present in initialization are removed as shown as a stylus is withdrawn from the plane.

Step C: Eliminate Debris, During Normal Operation:

The edges of all obstructions are measured. In general, obstructions include valid styli and debris or scratches. Each edge is compared with the edges stored in the Known Debris table. If a measured starting edge is found to coincide (with a plus or minus small margin) with a starting edge entry in the table, then this edge is assumed to be caused by debris. Likewise, if the measured ending edge is found to coincide with an ending edge entry in the table, then that edge is assumed to be caused by debris.

If both edges of an obstruction coincide, as measured above, with edges of Known Debris, then the entire obstruction is assumed to be caused by debris or a scratch. In this case both edges are discarded and receive no further processing.

If a measured starting edge is not coincident with a known starting edge, and the measured ending edge is not coincident with a known ending edge, then it is assumed that the obstruction is caused by a valid stylus.

While in this case it is possible that the obstruction caused by a valid stylus completely overlaps an obstruction caused by debris, this does not affect the resulting accuracy. The edges of all such valid pulses are passed to the computing function which computes the stylus position.

If one measured edge of an obstruction coincides, as measured above, with a Known Debris edge, and the other edge of the same obstruction does not, then it is assumed that the obstruction caused by a valid stylus and Known Debris partially overlaps, and that the coincident edge is the result of debris. This partial overlap is called an occlusion. The location of this coincident edge is therefore likely to be different from the true stylus edge and its correct location is estimated. Since the actual relationship between stylus edge and debris edge is unknown and random, the correct edge is estimated as the center of the Known Debris item which caused the coincident edge. This corrected edge and the other common known coincident edge are passed to the process which locates the XY coordinate of the touch.

Step D: Update of the Known Debris Table:

The Known Debris table is updated at times when it is determined that debris has been added to or removed from the light plane. There are many possible methods of determinining when the update the table, and various way of performin the update. One preferred method removes an entry from the table using the following process: At each pass of examining the measured edges and comparing them with Known Debris edges, if a pair of edges representing an item of debris is not found and is not overlapped by a valid stylus, then it is assumed that the debris item has been removed from the light plane. In this case the entry is removed from the table of Known Debris.

Entries are added to the table using the following process: Each pair of edges passed from the debris and scratch filter 32 (FIG. 3) to the compute location system is assumed to be associated with the valid stylus, but could in fact be due to a scratch or piece of debris. At each pass of examining measured edges all such edge pairs are put into a temporary table called "Debris Candidates" along with an entry indicating when this edge pair was first entered in the table. If an edge pair is found to be in the same location for many successive passes (longer than is reasonable for a real stylus), then it is determined that the edge pair is due to a new piece of debris or scratch. The edge pair is then entered in the table Known Debris and removed from the table Debris Candidate. Any edge pair in the table Debris Candidate which does not recur in the next pass is removed from the "Debris Candidate" table.

The process also compensates for debris which has been moved from one location to another on the reflecting surface. This is done as follows: Debris which moves is seen as the removal of debris at one location and a new piece at another location. It is removed from the table Known Debris when it is not observed in its original location and is added when it is observed to be stationary at the new location.

Several benefits are gained from this invention. Included in these benefits are the touch panel will continue to function even if scratches are inflicted on the reflective surfaces when the touch panel is in use by customers, a higher production yield of the touch panel will be achieved due to less susceptibility of materials imperfection and mechanical variations of frames, and the means which implement this invention add no additional cost to the system since there is sufficient program storage in the microcontroller base design of the present invention.

While the invention has been particularly shown and described with reference to a preferred embodiment thereof, it will be understood by those skilled in the art that various changes in form and details may be made therein without departing from the spirit and scope of the invention.

What is claimed is:

1. In an apparatus which determines the location of a pointer relative to a surface area by triangulation where the apparatus includes a light source, means for causing light beams from said source to form a light plane relative to the surface area, one or more reflective surfaces positioned at the periphery of said light plane and means for detecting the absence of light reflected from those surfaces, a method for compensating for aberrations in the reflective surfaces which may otherwise be interpreted as indicating the presence of a pointer, said method comprising the steps of:
   (a) activating the light beams to form the light plane relative to said surface area;
   (b) determining each beam position whereat an aberration indicating beam interruption occurs during a sequence while no pointer is in use;
   (c) determining each beam position whereat beam interruptions occur while a pointer is in use;
   (d) comparing the beam positions at interruptions occurring during no pointer use with beam positions at interruptions occurring during pointer use; and discarding beam positions only if the offset between their respective displacements fall within a range of predetermined values, otherwise performing further tests to distinguish aberration-cause signals from valid pointer signals.

2. The method set forth in claim 1 wherein the determining beam position steps of (b) and (c) above further include the steps of
   (e) generating a digital electronic image with pulses representing the position of beam interruption;
   (f) identifying a leading and a corresponding trailing edge for each pulse on said digital electronic image; and
   (g) correlating each pulse with a source of interruption in said light plane.

3. The method set forth in step (d) of claim 1 wherein the range of values includes zero.

4. The method set forth in step (d) of claim 1 wherein the further tests include determining the respective displacements for pairs of beam positions whereat interruptions occur with a beam position in a pair occurring with no pointer in use and another beam position in the pair occurring with pointer in use.

5. The method set forth in claim 4 further including the steps of identifying an interrupted beam position as a pointer position if the displacements for the interrupted beam position which occurs during pointer use and the interrupted beam position which occurs during no pointer use are not coincident.

6. In an apparatus which determines the location of a stylus relative to a surface area by triangulation where the apparatus includes a light source, means for causing light beams from said source to form a light plane relative to the surface area, one or more reflective surfaces positioned at the periphery of said light plane and means for detecting the absence of light reflected from those surfaces, a method for compensating for aberrations in the reflective surfaces which may otherwise be interpreted as indicating the presence of a stylus, said method comprising the steps of:
(a) activating the light plane;
(b) determining beam positions whereat interruption occurs within the light plane;
(c) comparing the beam positions in step (b) with a predetermined value and discarding all beam positions that are less than the predetermined value;
(d) determining each beam position whereat an aberration indicating beam interruption occurs during a sequence while no stylus is in use;
(e) determining each beam position whereat stylus beam interruptions occur while a stylus is in use;
(f) comparing the beam positions at interruptions occurring during no stylus use with beam positions at interruptions occurring during stylus use; and
(g) distinguishing between a valid stylus signal and an aberration-caused signal only if compared positions partially coincide.

7. The method of claim 6 wherein step (d) further includes the step of recording each beam position whereat an aberration indicating beam interruption occurs.

8. The method set forth in claim 7 further including the steps of periodically adjusting recorded information by adding new beam positions whereat new aberrations indicating beam interruptions occur and removing old beam positions whereat old aberration indicating interruptions occurred.

9. In an apparatus which determines the location of a pointer relative to a surface area by triangulation where the apparatus includes a light source, means for causing light beams from said source to form a light plane relative to the surface area, one or more reflective surfaces positioned at the periphery of said light plane and means for detecting the absence of light reflected from those surfaces, a method for compensating for aberrations in the reflective surfaces which may be otherwise be interrupted as indicating the presence of a pointer, said method comprising the steps of:
(a) generating a light plane image with interruptions caused by a pointer intersecting said surface area and debris and/or scratches located in said surface area;
(b) processing the light plane images and generating therefrom electronic images with pulses representing pointers interruptions and pulses representing debris and/or scratch interruptions;
(c) filtering the pulses representing debris and/or scratches; and
(d) performing further processing on the pulses representing pointers interruptions to identify a precise location at which the pointers intersect the surface area.

10. In a touch panel device having a light source, means for causing light beams from said source to form a light plane relative to a viewing surface, one or more reflective surfaces disposed at the periphery of the display screen, means for detecting the absence of light reflected from those surfaces and a triangulation method for determining the location of a stylus relative to the display screen, an apparatus for compensating for aberrations in the reflective surfaces which may otherwise be interpreted as indicating the presence of a stylus, said apparatus comprising:
means for generating light plane images with interruptions caused by the stylus intersecting said display screen and debris and/or scratches located on said reflective surfaces;
means for receiving the light plane images and generating therefrom electronic images with pulses representative of styli interruptions and pulses representative of debris and/or scratches interruptions;
means for analyzing the electronic images and filtering all pulses which represent debris and/or scratches interruptions; and
means for processing the pulses representative of styli interruptions to determine the precise location whereat the styli intersect the display screen.

11. For use with an interface apparatus which determine the location of a stylus relative to a surface area by triangulation where the apparatus includes a light source, means for causing a light beam from the source to scan across the surface area, one or more reflective surfaces and means for detecting the presence or absence of light reflected from those surfaces, a method for compensating for aberrations in the reflective surfaces which might otherwise be interpreted as indicating the presence of a stylus, said method comprising the steps of:
causing the light beam to scan the surface area during a power-up sequence while no stylus is in use;
recording each beam position at which an aberration-indicating beam interruption occurs;
comparing the beam positions at interruptions which occur during normal apparatus operation with the recorded beam positions; and
distinguishing an aberration-caused signal from a valid stylus signal if the compared positions fall within a range of predetermined values.

12. The method set forth in claim 4 further including the steps of identifying an interrupted beam position as a pointer position if the displacement for the interrupted beam position occurring during pointer use in not coincident and straddles the displacement for the interrupted beam position occurring during no pointer use.

13. The method set forth in claim 4 further including the steps of identifying an interrupted beam position as a pointer position if the displacement for the interrupted beam position occurring during pointer use is partially coincident and overlaps the displacement for a beam position which occurs during no pointer use.

14. In an apparatus which determines the location of a pointer relative to a surface area by triangulation where the apparatus includes a light source, means for causing light beams from said source to form a light plane relative to the surface area, one or more reflective surfaces positioned at the periphery of said light plane and means for detecting the absence of light reflected from those surfaces, a method for compensating for aberrations in the reflective surfaces which may otherwise be interpreted as indicating the presence of a pointer, said method comprising the steps of:
(a) activating the light beams to form the light plane relative to said surface area;
(b) determining aberration locations within said surface area whereat beam interruptions occur when no pointer is used to touch locations in said surface area;
(c) determining pointer locations within said surface whereat beam interruptions occur when a pointer is used, to touch locations within the surface area;
(d) comparing selected ones of the aberration locations with selected ones of the pointer locations; and (e) discarding those aberration locations positioned a predetermined distance from pointer locations.

15. In an apparatus which determines the location of a pointer relative to a surface area by triangulation where the apparatus includes a light source, means for causing light beams from said source to form a light plane relative to the surface area, one or more reflective surfaces positioned at the periphery of said light plane and means for detecting the absence of light reflected from those surfaces, a device for compensating for aberrations in the reflective surfaces which may otherwise be interpreted as indicating the presence of a pointer, said device comprising:

(a) means for activating the light beams to form the light plane relative to said surface area;

(b) means for determining aberration locations within said surface area whereat beam interruptions occur when no pointer is used to touch locations in said surface area;

(c) means for determining pointer locations within said surface whereat beam interruptions occur when a pointer is used, to touch locations within the surface area;

(d) means for comparing selected ones of the aberration locations with selected ones of the pointer locations; and (e) means for discarding those aberration locations positioned a predetermined distance from pointer locations. i

* * * * *